(12) United States Patent
Navarra et al.

(10) Patent No.: US 8,461,783 B2
(45) Date of Patent: Jun. 11, 2013

(54) ELECTRIC DRIVE UNIT FOR A WATER-BEARING DOMESTIC APPLIANCE

(75) Inventors: Pietro Navarra, Saronno (IT); Michael Rosenbauer, Reimlingen (DE); Hans-Dieter Rossteuscher, Giengen (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 414 days.

(21) Appl. No.: 12/666,298

(22) PCT Filed: Jun. 11, 2008

(86) PCT No.: PCT/EP2008/057324
§ 371 (c)(1),
(2), (4) Date: Mar. 5, 2010

(87) PCT Pub. No.: WO2009/003809
PCT Pub. Date: Jan. 8, 2009

(65) Prior Publication Data
US 2010/0176754 A1    Jul. 15, 2010

(30) Foreign Application Priority Data
Jun. 29, 2007   (DE) .................. 10 2007 030 072

(51) Int. Cl.
*H02P 5/00*         (2006.01)
*H02P 5/695*        (2006.01)
(52) U.S. Cl.
CPC .................... *H02P 5/695* (2013.01)
USPC ........ 318/8; 318/700; 318/400.3; 318/400.01
(58) Field of Classification Search
CPC ..................................... H02P 5/695
USPC ................... 318/8, 400.3, 400.1, 700
See application file for complete search history.

(56) References Cited

U.S. PATENT DOCUMENTS

| | | | |
|---|---|---|---|
| 5,313,150 A * | 5/1994 | Arakawa et al. | 318/768 |
| 5,528,114 A * | 6/1996 | Tokizaki et al. | 318/67 |
| 6,445,879 B1 * | 9/2002 | Youn et al. | 388/811 |
| 6,775,468 B2 * | 8/2004 | Zinke et al. | 388/800 |

(Continued)

FOREIGN PATENT DOCUMENTS

| | | |
|---|---|---|
| DE | 3913639 A1 | 10/1990 |
| DE | 10339130 A1 | 3/2004 |
| DE | 102004019343 A1 | 7/2005 |

OTHER PUBLICATIONS

Instrument Power Supplies, Moore Industries International Inc., Sep. 1995.*

(Continued)

*Primary Examiner* — Walter Benson
*Assistant Examiner* — David Luo
(74) *Attorney, Agent, or Firm* — James E. Howard; Andre Pallapies

(57) ABSTRACT

An electric drive unit for a water-bearing domestic appliance having a converter to provide a supply voltage from a multiphase voltage system; a control device to control the converter in order to operate a first electric motor connected to the multiphase voltage system; a load-current-carrying DC link arranged upstream of the converter; and an electrical device connected to at least part of the multiphase voltage system or the load-current-carrying DC link via a connection device, wherein the electrical device has a second electric to operate a hydraulic pump and/or a blower and/or a valve.

21 Claims, 4 Drawing Sheets

U.S. PATENT DOCUMENTS

| | | | |
|---|---|---|---|
| 7,504,784 B2 * | 3/2009 | Asada et al. | 318/51 |
| 7,748,482 B2 * | 7/2010 | Holmes et al. | 180/65.22 |
| 2003/0034749 A1 | 2/2003 | Zinke et al. | |
| 2007/0163626 A1 | 7/2007 | Klein | |

OTHER PUBLICATIONS

PECO II Power Supply Data Sheet, PECO II, Galion, OH, Aug. 2006.*

* cited by examiner

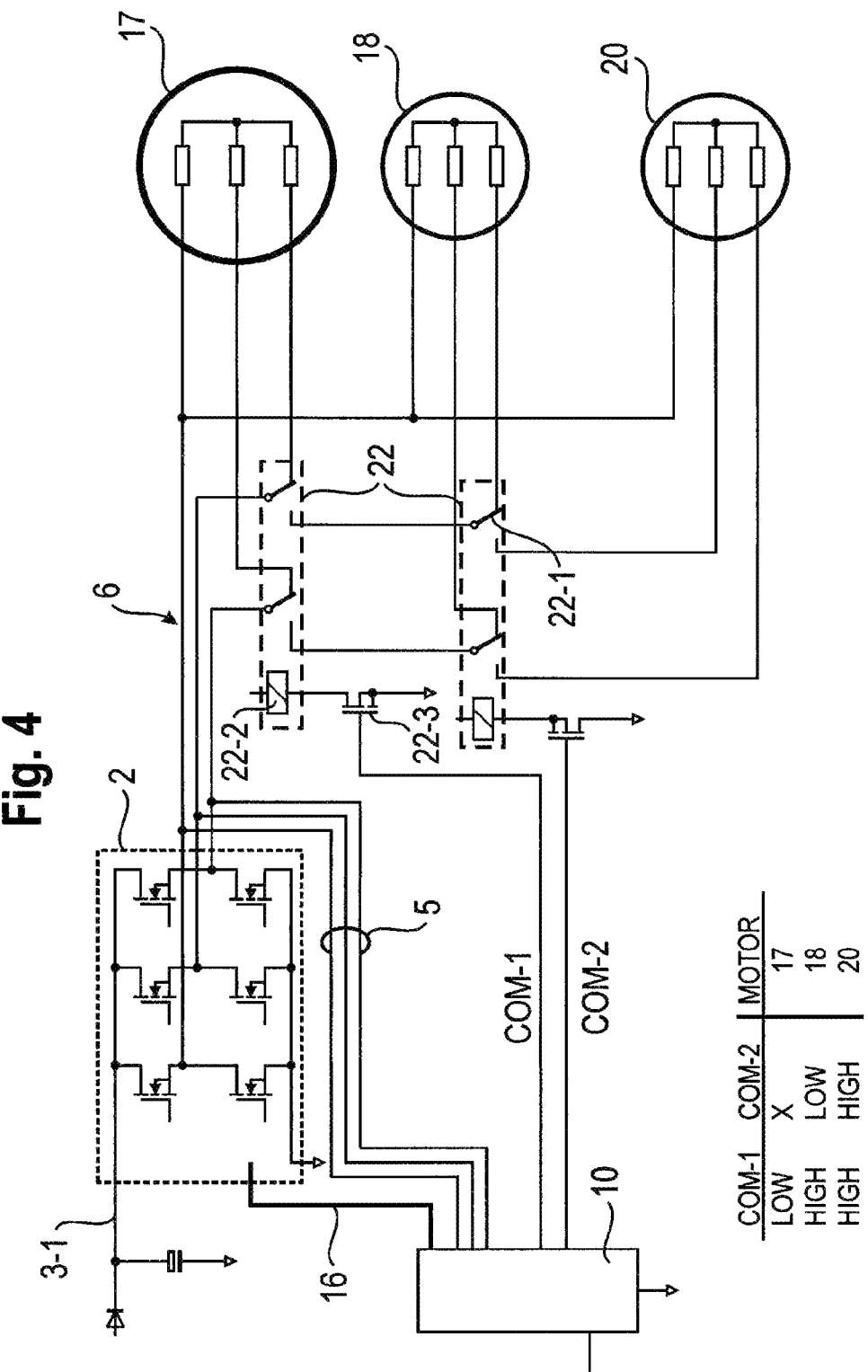

ELECTRIC DRIVE UNIT FOR A WATER-BEARING DOMESTIC APPLIANCE

BACKGROUND OF THE INVENTION

The present invention relates to an electric drive unit for a water-bearing domestic appliance. The invention also relates to a domestic appliance having at least one hydraulic pump and an electric drive unit.

In a water-bearing domestic appliance, in particular a dishwasher, it is common for a plurality of types of hydraulic pumps to be used. For example, a hydraulic pump is provided as a circulating pump for use during the washing process and another hydraulic pump as a drain pump for pumping out the water on completion of a wash program or program section. Such hydraulic pumps are disposed in the sump of a dishwasher and are generally supplied with system voltage from the domestic (mains) system. This type of hydraulic pump is also known, for example, in the field of washing machines, which generally have both circulating pumps and drain pumps.

DE 101 39 928 A1 discloses a dishwasher pump drive in which a DC voltage motor with permanent magnet rotor and with sensor commutator for rotor-position-dependent polarity reversal of the magnetomotive force of the field winding is used as a pump motor. The field circuit can be supplied from the rectifier provided on a circuit board of the operating circuit, said rectifier enabling the DC motor to be operated from an AC voltage system. For each field winding, the two-phase DC motor has two inverse coil sections which are alternately supplied with current via a changeover switch. A commutator sensitive to the polarity of the multipole permanent magnet rotor mounted in the air gap as a wet rotor specifies which of the two field windings is to be instantaneously subjected to magnetomotive force.

DE 39 13 639 A1 describes a modular wiring arrangement in domestic dishwashers which uses a common distribution circuit board and supplies all the small loads with 42V protective voltage, thereby enabling the wiring arrangement to be clearly structured and inexpensive low-voltage components to be implemented. All the leads to the loads such as heater and pump motors are connected to corresponding make-contacts and supplied with system voltage after actuation of a main control switch. On the load side of a distribution circuit board, an isolating transformer is provided whose secondary side has a rated voltage of max. 42V. This is to be regarded as a safety extra-low voltage and in turn supplies the control side and therefore the small loads via the main control switch.

In DE 103 39 130 A1, a domestic appliance such as a washing machine or dishwasher with circulation of liquid is described in which the drive motors for the hydraulic pumps are activated such that at least one of the two pumps can be connected to a control unit for open-loop and/or closed-loop motor control, the central component of the control unit being a computer with a processor and the control unit being able to be used as the central open- and closed-loop control unit of the appliance. It assumes the function of control unit for two hydraulic pumps, in particular a circulating pump and a drain pump. There is additionally provided a plurality of sensors on a connection side of the computer which are used to detect one or more machine parameters. For example, one of said sensors is implemented as a load sensor for detecting a pump load or more specifically the pump input current, a number of actuators then being actuated by the control unit as a function of the sensor data. DC voltage motors, for example, can be used for pump drive, thereby eliminating the hitherto occasionally produced hum caused by the operating voltage ripple. A DC voltage of 42 volts, for example, or lower can be used in the low voltage range, particular safety advantages being able to be achieved in this connection. With the large number of sensors or actuators connected to the computer, drive control is comparatively complex and must provide different supply systems for the different sensors and actuators and for the pump drive.

BRIEF SUMMARY OF THE INVENTION

The object of the present invention is to specify an electric drive unit for hydraulic pumps in a water-bearing domestic appliance, by means of which technically simpler electronic motor management for driving a hydraulic pump can be implemented. The object of the present invention is also to specify a corresponding water-bearing domestic appliance.

The electric drive unit according to the invention contains a controllable converter for providing a supply voltage from a multiphase, in particular 3-phase, voltage system. Connectable to the multiphase voltage system is at least one electric motor which is implemented in particular as a permanent magnet excited synchronous motor for driving a hydraulic pump. A control device is used to activate the converter to operate the electric motor from the multiphase voltage system. Additionally provided is an electrical device which can be connected via a connection device to at least one part of the multiphase voltage system or to a load-current-carrying DC link upstream of the converter, said electrical device comprising at least one additional electric motor for another hydraulic pump and/or a blower and/or at least one valve.

According to the invention it is therefore possible, by means of a common control device for activating the converter which provides a supply voltage from the multiphase, in particular 3-phase, voltage system, to control not only the electric motor for driving a hydraulic pump, but also other electrical components such as other electric motors for other hydraulic pumps or an electrically controlled valve. This enables a uniform supply system to be provided both for supplying the electric motors for the hydraulic pumps and for other electrical components, the central elements of said system being the controllable converter, the 3-phase voltage system and the control device for activating the converter. The control device, e.g. in the form of a motor controller, can therefore undertake other control functions for the other electrical components, which means that these components require no separate controllers of their own. The advantage of using permanent magnet excited synchronous motors for pump drive is that they can be activated via the converter without complex sensor systems so that, all in all, technically simpler electronic motor management, in particular without speed sensor, can be implemented.

In a further development of the electric drive unit according to the invention, a plurality of electric motors for driving respective hydraulic pumps are provided which are permanent magnet excited synchronous motors and can be connected to the multiphase voltage system via a connection device. Here the control device is implemented as a common control device for the electric motors which is used for activating the converter to operate one of the electric motors from the multiphase voltage system.

In an advantageous embodiment of the invention there is provided a feedback connection for tapping off an electrical measured variable from the multiphase voltage system and feeding said electrical measured variable into the control device, the latter activating the converter as a function of said electrical measured variable. With the aid of the electrical measured variable, the control device is therefore able, without complex sensor systems, to activate the converter to operate the electric motor for driving a hydraulic pump. In particular, the converter is activated such that a specific rotation direction and speed of the hydraulic pump is set.

In an advantageous embodiment, an induced voltage on one or more conductors of the multiphase voltage system is obtained as the electrical measured variable, and a converter flow control valve activating sequence is determined therefrom. In this way it is possible, without using e.g. a Hall sensor, to ascertain the rotation direction and speed of the electric motor and activate the converter or more specifically its flow control valves such that the desired rotation direction and speed of the motor is obtained. In particular, an induced voltage on one or more multiphase voltage system conductors to which a voltage is not being applied by the converter at that point in time is detected by the control device as an electrical measured variable. By means of the electrical measured variable, this embodiment of a control device makes it possible to detect when the hydraulic pump is in a blocked state. The converter is then activated by the control device such that a supply voltage provided by the converter is switched off. This kind of control is useful in that, when the operated hydraulic pump is in the blocked state, a correspondingly low motor speed occurs which can be detected by the control device by determining the speed, thereby obviating the need for a motor circuit breaker, as a protection mechanism can be implemented via determination of the speed and rotation direction. This means that the use of a load sensor for detecting the load current can be dispensed with.

In a corresponding manner, the electrical measured variable enables the control device to detect when the operating hydraulic pump is in an idle state, in which case the control device activates the converter such that a supply voltage of the converter is switched off. This enables in particular the "snorkeling" noise produced while liquid is being pumped out of the appliance when the hydraulic pump is idling to be avoided.

In a further development of the invention, the converter is connected on the input side to an DC link which carries the load current for an operated hydraulic pump. There is additionally provided a power supply unit which is connected to the DC link on the output side to generate an output side DC link voltage from an input side system voltage. In particular, a DC link voltage in the low voltage range is advantageously produced by the power supply unit, in particular a DC link voltage of approximately 42 volts. This provides a number of safety-relevant advantages, as above all no grounding of the electrical components is necessary and current-carrying parts can be touched. In addition, creepage distances and clearances as required for system voltage operation do not need to be maintained. An accidental energization i.e. a parasitic voltage drop, e.g. in the event of leaks, is not a problem.

Further advantageous embodiments and further developments of the invention are set forth in sub-claims.

The invention also relates to a domestic appliance with at least one hydraulic pump and an above described electric drive unit.

BRIEF DESCRIPTION OF THE DRAWINGS

The invention will now be explained in greater detail with reference to the accompanying drawings which illustrate advantageous embodiments of the present invention:

FIGS. 2 to 4 show further advantageous embodiments of an inventive electric drive unit for hydraulic pumps in a detail view compared to FIG. 1.

DETAILED DESCRIPTION OF EXEMPLARY EMBODIMENTS OF THE PRESENT INVENTION

Figure 1:
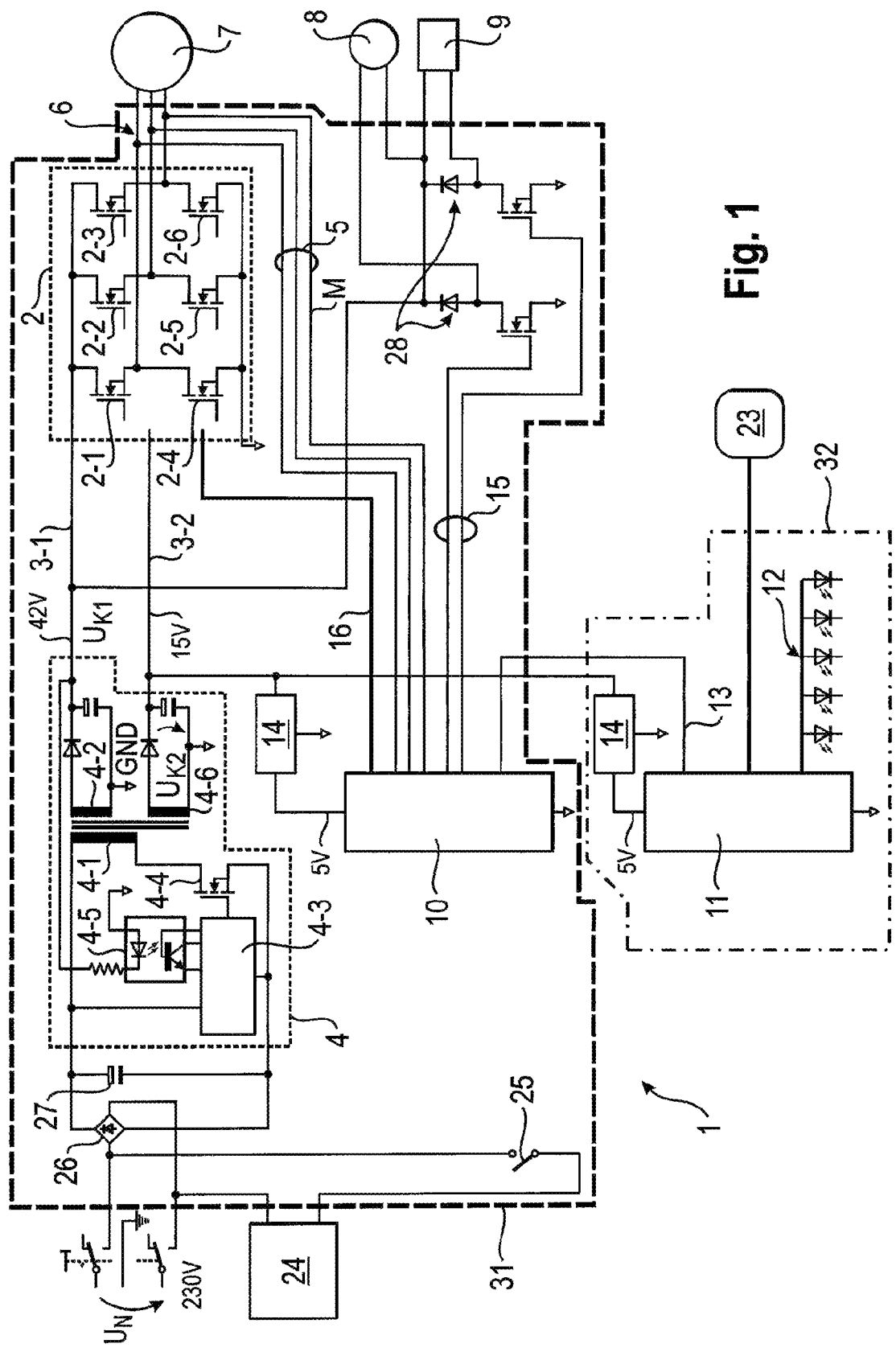
FIG. 1 shows an embodiment of an electric drive unit according to the invention for operating a plurality of hydraulic pumps in a dishwasher, as well as a water valve, from a common control device.

FIG. 1 is a block diagram of an inventive electric drive unit for operating hydraulic pumps in a dishwasher. A comparable electric drive unit can also be used in the same way, for example, in a washing machine for operating corresponding hydraulic pumps. The electric drive unit 1 according to FIG. 1 has a so-called power board 31 containing a power supply unit 4 connected on the input side to a system voltage $U_N$ of e.g. 230 V via a rectifier 26 and a capacitor 27. A heating element 24, for example, is also connected to said system voltage $U_N$ via a switch 25. The power supply unit 4 contains a per se known flyback converter topology having in particular a reactor 4-1 which is operatively connected to the reactor 4-2. The reactor 4-1 is likewise operatively connected to the reactor 4-6. The switching element 4-4 in the form of a transistor is activated by a control circuit 4-3 which is in turn controlled by an optocoupler 4-5. The optocoupler 4-5 is in turn connected to the DC link 3-1 via a feedback connection. As this topology and the way it works will be familiar in principle to an average person skilled in the art, its function will not be described in greater detail.

The power supply unit 4 is connected on the output side to a load-current-carrying DC link 3-1 to produce the output side DC link voltage $U_{K1}$ of e.g. 42 V. The power supply unit 4 is also connected on the output side to a DC link 3-2 to produce an output side DC link voltage $U_{K2}$ of 15 V. The control circuits 10 and 11 are supplied with voltage via the DC link 3-2, their respective conversion circuitry 14 converting the voltage of 15 V to a voltage of 5 V which is applied to the control circuits 10 and 11 on the input side.

Also present is a controllable converter 2 for providing a supply voltage from a 3-phase voltage system 6. The converter 2 has a monolithic integrated circuit on which the switching valves 2-1 to 2-6 (in the form of MOSFETS) of the converter 2 are disposed. The switching valves 2-1 to 2-6 are activated by the control circuit 10 via a control connection 16, the activation of the switching valves 2-1 to 2-6 by the control connection 16 not being shown in greater detail for reasons of clarity. The input of the converter 2 is connected to the DC link 3-1 such that the voltage $U_{K1}$ (42 V) is applied to the switching valves 2-1 to 2-3 via their upper drain terminal and reference potential GND is applied to the switching valves 2-4 to 2-6 via their lower source terminal. The converter 2 provides a flexible voltage system from the voltage system 6, which is made possible by the 3-phase actuator. In this way a 3-phase voltage system with variable frequency and voltage amplitude is provided from the DC voltage of the DC link 3-1. The converter 2 operates, for example, according to the model of a 3-phase pulse-controlled inverter which assumes different switching states by means of corresponding activation of the switching valves and therefore creates a three-phase voltage system for driving the electric motor of a hydraulic pump 7.

Figure 2:
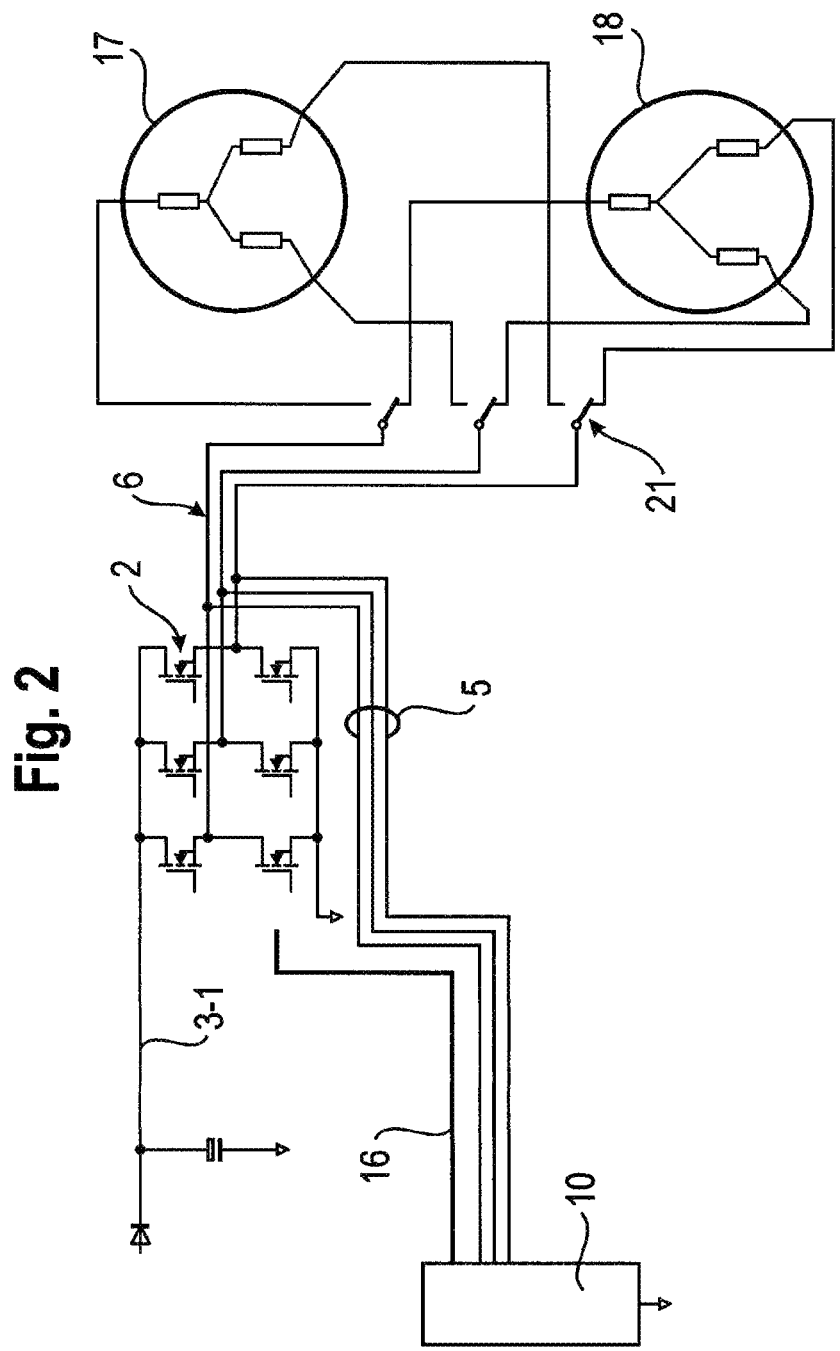
Figure 3:
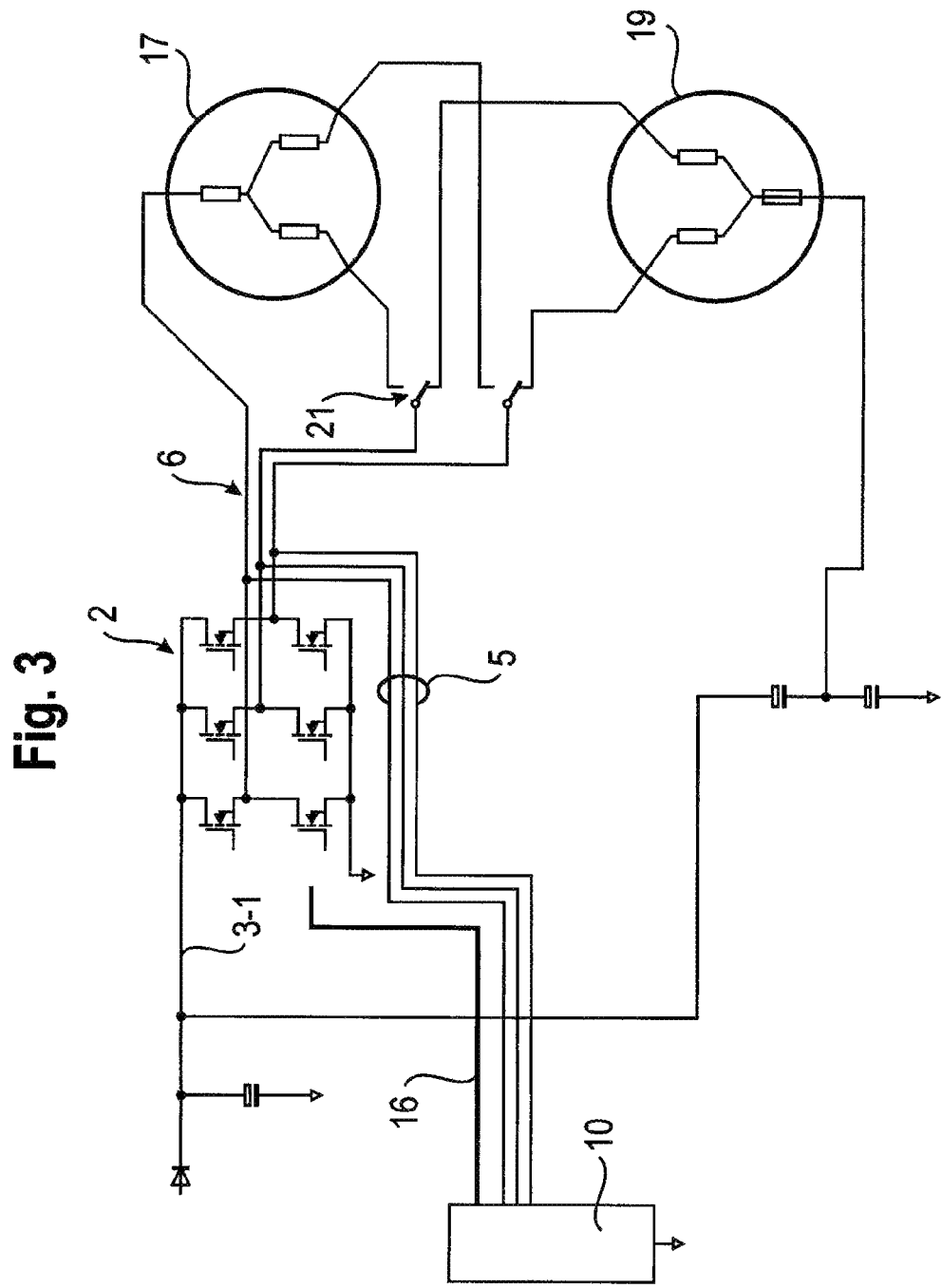

The electric motor of the hydraulic pump 7, which will be described in greater detail below with reference to FIGS. 2 to 4, is implemented as a permanent magnet excited synchronous motor and connected to the 3-phase voltage system. The hydraulic pump 7 is implemented, for example, as a circulating pump of a dishwasher. The permanent magnet excited synchronous motor belongs to the category of polyphase machines and has a symmetrical 3-phase stator winding which is supplied with 3-phase AC voltage. The exciting field is generally produced by flat permanent magnets which are uniformly mounted on the circumference of the rotor according to their polarity. The control circuit 10, e.g. in the form of a motor controller, is used to activate the converter 2 to operate the electric motor of the hydraulic pump 7 from the 3-phase voltage system, a feedback connection 5 being provided to tap off an electrical measured variable M from the 3-phase voltage system 6 and to inject said measured variable M into the control circuit 10. This measured variable M is also taken into account for the activation of the converter 2 by the control circuit 10.

In addition to the hydraulic pump 7 with associated electric motor, other electrical devices are provided, in the form of another hydraulic pump 8 and a water valve 9 in the example in FIG. 1. The hydraulic pump 8 is implemented, for example, as a drain pump of a dishwasher and can be connected to the DC link 3-1 via a connection device 28. The hydraulic pump 8 likewise comprises an electric motor which is implemented, for example, as a permanent magnet DC motor. The connection device 28 contains transistors and diodes in the configuration shown in FIG. 1, the transistors of the connection device 28 being activatable by the control circuit 10 via a control line 15 in order to switch the hydraulic pump 8 and water valve 9 on and off respectively.

The dishwasher with the drive unit according to the invention additionally comprises the appliance's main electronics 32 disposed remotely from the power board 31 and another control circuit 11 which communicates with the control circuit 10 via a bus system 13. The control circuit 11 is connected to an LED display 12. A sensor device 23 is additionally provided which contains e.g. temperature sensors, pressure sensors or the like for detecting corresponding machine parameters. In a further development of the invention it would be easily possible to combine the control circuits 10 and 11 into a common control device disposed e.g. on the power board 31.

As illustrated in FIG. 1, the electrical components of the drive unit 1 which carry a load current for operating the hydraulic pumps 7 and 8 and the water valve 9, and also the control circuit 10 on the power board 31, are disposed in an area of the dishwasher remote from the main appliance electronics 32. For example, the main appliance electronics 32 are disposed in a door area of the dishwasher, while the pump motor and other electronic devices are controlled via bus communication from the main appliance electronics 32 to the motor electronics on the power board 31. This has the advantage of short supply lines and also that the wiring harness to and from the main appliance electronics, which goes through the door area, can be implemented in a correspondingly low wire count manner.

FIG. 2 shows another embodiment of an electric drive unit according to the invention in a detail view compared to FIG. 1. To operate the hydraulic pump 7 according to FIG. 1, an electric motor 17 is provided which is implemented as a permanent magnet excited synchronous motor and whose star connected 3-phase stator winding is shown in greater detail in FIG. 2. The electric motor 17 can be connected to the 3-phase voltage system 6 via a connection device 21 formed by a switch arrangement actuatable in parallel. Another electric motor 18, e.g. for operating the drain pump 8 according to FIG. 1, is provided which is of the same design as the electric motor 17. The electric motor 18 can be connected to the 3-phase voltage system 6 via the connection device 21 such that the hydraulic pump 7 and the hydraulic pump 8 can be alternately operated from the 3-phase voltage system 6 via the electric motor 17 and the electric motor 18 respectively via the converter 2. Here the control circuit 10 acts as a common control device for the electric motors 17 and 18 for activating the converter 2 to operate one of the electric motors 17 or 18 from the 3-phase voltage system 6.

FIG. 3 shows another embodiment of an inventive electric drive unit which, in contrast to the embodiment illustrated in FIG. 2, instead of the 3-phase permanent magnet synchronous motor 18, has a 2-phase permanent magnet synchronous motor 19. The latter can be connected via the connection device 21 to part of the 3-phase voltage system 6, more precisely to two conductors of the voltage system. The electric motor 19 is likewise used, for example, to drive a hydraulic pump 8 according to FIG. 1.

FIG. 4 shows an extended embodiment of the invention compared to FIGS. 2 and 3 in which, in addition to the electric motors 17 and 18 for operating respective hydraulic pumps, an electric motor 20 is provided, e.g. in order to operate a dishwasher blower or fan. The electric motors 17, 18 and 20 are each implemented as 3-phase permanent magnet excited synchronous motors (so-called PM brushless DC technology). They can be connected via a connection device 22 to the 3-phase voltage system 6, said connection device 22 being activatable by the control circuit 10. The connection device 22 contains switches 22-1 and relays 22-2 for actuating the switches 22-1. The relays 22-2 are in turn switchable via a respective transistor 22-3, the upper part of the connection device 22 being activated by the control signal COM-1 and the lower part of the connection device 22 by control signal COM-2. According to the truth table shown in the lower part of FIG. 4, the individual electric motors 17, 18 and 20 are alternately connected to the voltage system 6 depending on the signal state of the control signal COM-1 and the control signal COM-2.

An advantage of the electric drive unit according to the invention is that a speed sensor for measuring the rotation direction and speed of the operated hydraulic pump can be dispensed with. An induced voltage on one or more conductors of the 3-phase voltage system 6 is detected by the control circuit 10 via the feedback connection 5 as an electrical measured variable M so that a rotation direction and speed of the electric motor can be calculated from it by the control circuit 10. On the basis of this calculation, an activation sequence of the flow control valves 2-1 to 2-6 of the converter 2 is determined. In particular, the induced voltage on the conductors of the 3-phase voltage system 6 to which a voltage is not applied at this point in time by the converter 2 is detected. This provides an advantageous means of determining when the operated hydraulic pump is in a blocked state so that the supply voltage provided by the converter 2 can be turned off. It can likewise be determined when the operated hydraulic pump is in an idle state, so that the supply voltage provided by the converter 2 can then likewise be turned off in order in particular to prevent the so-called snorkeling noise. This kind of control in particular obviates the need for a motor protector in the form of a circuit breaker. Moreover, a Hall sensor for measuring the speed of the electric motor can be dispensed with.

Supplying an operating voltage in the low voltage range for the inventive electric drive control system according to FIGS. 1 to 4 provides a number of further advantages compared to operation from a system voltage. In particular, 42 V DC operation of the electronic components provides the following significant advantages in terms of dishwasher design:

Less stringent safety-relevant requirements can be placed on the electrical components of the drive unit, as already mentioned above. For the converter, an inexpensive so-called "six switch" monolithic integrated circuit for low voltage operation can be used. Using low voltage electric motors means that fewer turns of thicker winding wire are used, thereby improving winding quality and reducing costs. Through significant efficiency improvements, the type of motor used in the form of a permanent magnet excited synchronous motor provides higher performance compared to a synchronous motor. In particular, lower operating noise can be achieved, as in particular no 100 Hz hum caused by system voltage ripple occurs. In addition, the hydraulic pump can be differently designed so that the pump is less sensitive to oversize bodies. The electrical utilization of the electric motors can be increased, as operation from the uniform 42 V operating voltage takes place independently of fluctuations in the system voltage. It is therefore no longer necessary to overdesign the motors in respect of system voltage fluctuations.

In respect of an electrically operated valve, comparable advantages are possible, in particular increased magnetic forces and lower operating noise. Using few turns of thicker winding wire enables windings to be manufactured with higher quality and lower costs. In addition, the electrical utilization is increased, as a uniform operating voltage is provided both for the pump drive and for the other components.

It should also be mentioned here that the voltage of 42 V has been selected by way of example. DC operating voltages of a different magnitude could also be selected in this context. When using so-called aquastop valve technology, which prevents liquid from flowing out at the water supply in the event of inlet hose breakage, it makes it possible to use correspondingly more weakly insulated water valve supply line conductors. In addition, it is not necessary to seal the water valve with a potting compound

The invention claimed is:

1. An electric drive unit for a water-bearing domestic appliance, comprising:
    a converter to provide a supply voltage from a multiphase voltage system;
    a control device to control the converter in order to operate a first electric motor connected to the multiphase voltage system;
    a load-current-carrying DC link arranged upstream of the converter;
    a connection device coupled to the control device; and
    an electrical device connected to one of at least part of the multiphase voltage system and the load-current-carrying DC link via the connection device, the electrical device having a second electric motor structured to operate at least one of a hydraulic pump, a blower, and a valve.

2. The electric drive of claim 1, wherein the water-bearing domestic appliance is one of a domestic dishwasher and a washing machine, and wherein the multiphase voltage system is a 3-phase voltage system.

3. The electric drive unit of claim 1, wherein the first electric motor and the second electric motor are permanent-magnet excited synchronous motors to drive respective hydraulic pumps, the first and second electric motor connected to the multiphase voltage system via the connection device; and
    wherein the control device is a common control device for the first and second electric motors to control the converter in order to operate one of the first and second electric motors connected to the multiphase voltage system.

4. The electric drive unit of claim 1, further comprising a feedback connection to tap off an electrical measured variable from the multiphase voltage system and to feed the electrical measured variable into the control device, wherein the control device controls the converter as a function of the electrical measured variable.

5. The electric drive unit of claim 4, wherein the control device controls the converter on the basis of the electrical measured variable such that a specific rotation direction and speed of the hydraulic pump is obtained.

6. The electric drive unit of claim 4, wherein the control device is structured to detect an induced voltage on at least one conductor of the multiphase voltage system as the electrical measured variable, and wherein, based on the detected induced voltage, a control sequence of flow control valves of the converter is determined.

7. The electric drive unit of claim 4, wherein the control device is structured to detect an induced voltage on at least one conductor of the multiphase voltage system as the electrical measured variable, and wherein the converter does not apply a voltage to the at least one conductor at the time of detecting the induced voltage.

8. The electric drive unit of claim 4, wherein, by means of the electrical measured variable, the control device is structured to detect when the hydraulic pump is in a blocked state, and wherein the control device, based on the detecting of the blocked state, controls the converter such that the supply voltage provided by the converter is turned off.

9. The electric drive unit of claim 4, wherein, by means of the electrical measured variable, the control device is structured to detect when the hydraulic pump is in an idle state, and wherein the control device, based on the detecting of the idle state, controls the converter such that the supply voltage provided by the converter is turned off.

10. The electric drive unit of claim 1, wherein the converter is connected on an input side to the load-current-carrying DC link, and wherein a power supply unit is connected on an output side to the load-current-carrying DC link to produce an output side DC link voltage from an input side system voltage.

11. The electric drive unit of claim 10, wherein the output side DC link voltage produced by the power supply unit is in a low voltage range.

12. The electric drive unit of claim 11, wherein the output side DC link voltage is 42 V.

13. The electric drive unit of claim 1, wherein the converter has switching valves, and wherein the converter includes a monolithic integrated circuit on which the switching valves are disposed.

14. The electric drive unit of claim 1, further comprising at least one permanent-magnet excited synchronous motor having a wet rotor.

15. The electric drive unit of claim 1, wherein the water-bearing domestic appliance has a main electronics component, and wherein the control device and electric components of the electric drive unit that carry a load current to operate the hydraulic pump are disposed in an area of the water-bearing domestic appliance that is located at a predetermined distance from the main electronics component.

16. A domestic appliance, comprising:
    an electric drive unit including:
        a converter to provide a supply voltage from a multiphase voltage system;
        a control device to control the converter in order to operate a first electric motor connected to the multiphase voltage system;

a load-current-carrying DC link arranged upstream of the converter;

a connection device coupled to the control device; and an electrical device connected to one of at least part of the multiphase voltage system and the load-current-carrying DC link via the connection device, the electrical device a second electric motor electric motor structured to operate at least one of a hydraulic pump, a blower, and a valve.

17. The domestic appliance in accordance to claim 16, wherein the connection device is selected from a group consisting of transistor, diode, or a combination thereof; and wherein the connection device is activatable by the control device via a control line in order to switch at least one of the hydraulic pump, the blower, the valve, or a combination thereof.

18. The domestic appliance in accordance to claim 16, wherein the control device controls the converter on the basis of an electrical measured variable such that a specific rotation direction and speed of the hydraulic pump is obtained.

19. A power board for a water-bearing domestic appliance, comprising:

a converter to provide a supply voltage from a multiphase voltage system, wherein the converter comprises first, second, and third power stages connected in parallel across a voltage bus and ground, wherein each power stage includes first and second switching devices connected in series at respective power electrodes, and wherein each power stage further includes an output node between respective first and second based switching devices for providing a power signal and wherein each of said first and second switching devices comprises at least two control terminals;

a control device to control the converter through the control terminals in order to operate a first electric motor connected to the multiphase voltage system;

a load-current-carrying DC link arranged upstream of the converter and coupled to the voltage bus;

a connection device coupled to the control device; and an electrical device connected to one of at least part of the multiphase voltage system and the load-current-carrying DC link via the connection device, the electrical device having a second electric motor structured to operate at least one of a hydraulic pump, a blower, and a valve;

wherein a control logic at the control device is capable of connecting the first motor and the second motor to the multiphase voltage system.

20. The power board in accordance to claim 19, wherein the first electric motor and the second electric motor are permanent-magnet excited synchronous motors to drive respective hydraulic pumps, the first and second electric motor connected to the multiphase voltage system via the connection device; and wherein the control device is a common control device for the first and second electric motors to control the converter in order to operate one of the first and second electric motors connected to the multiphase voltage system.

21. The power board in accordance to claim 20, wherein the output side DC link voltage produced by the power supply unit is in a low voltage range selected from a group consisting of 5V, 42V, or combination thereof.

* * * * *

UNITED STATES PATENT AND TRADEMARK OFFICE
CERTIFICATE OF CORRECTION

PATENT NO.       : 8,461,783 B2  
APPLICATION NO. : 12/666298  
DATED            : June 11, 2013  
INVENTOR(S)      : Navarra et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 601 days.

Signed and Sealed this
Eighth Day of September, 2015

Michelle K. Lee
*Director of the United States Patent and Trademark Office*